June 2, 1959 L. G. FISCHER ET AL 2,889,457
TRIGGERED PULSE GENERATOR
Filed April 9, 1956
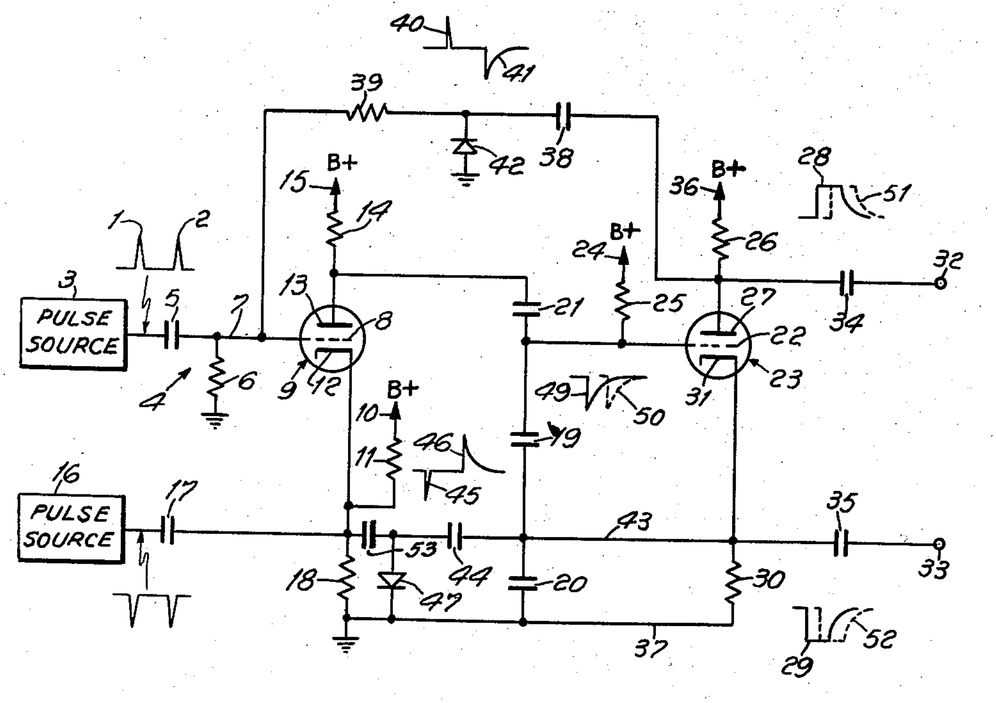
INVENTORS
LAURIN G. FISCHER
RICHARD C. NEUNZIG
BY Philip M. Bolton
ATTORNEY United States Patent Office 2,889,457

Patented June 2, 1959

2,889,457

TRIGGERED PULSE GENERATOR

Laurin G. Fischer, Glen Rock, and Richard C. Neunzig, Madison, N.J., assignors to International Telephone and Telegraph Corporation, Nutley, N.J., a corporation of Maryland Application April 9, 1956, Serial No. 577,152

8 Claims. (Cl. 250—27)

This invention relates to a triggered pulse generator in which an output pulse of a predetermined amplitude and duration is normally produced in response to an input trigger pulse.

Triggered pulse generators of the type to which this invention has reference are adapted in response to each input trigger pulse to produce an output pulse of a predetermined amplitude and duration. Such output pulses may be used, for example, in "blanking" circuits to block or unblock a circuit and are usually of much greater duration than the input trigger pulse.

In many of such arrangements, such as in the standard monostable multivibrator, there is a relatively long period after the generator has been triggered during which it will be nonresponsive to the next trigger pulse. In other words, such multivibrators require a given recovery time during which they will not respond. The main reason for this is in the exponentially changing voltage applied to the grid of the input tube from the plate circuit of the other tube. Because of this exponential characteristic, another triggering cannot occur until the exponential return to a stable level is almost completed, unless, of course, an extraordinarily large-amplitude trigger pulse is applied.

In many systems, it is required that for each input trigger pulse a generated output pulse must be produced even though the input trigger pulses may be derived from a multiplicity of nonsynchronous sources and some pulses may follow others at closely spaced intervals.

An object of the present invention is the provision of a triggered pulse generator having a relatively rapid recovery and capable of responding to successive trigger pulses even though they are very closely spaced in time.

In many arrangements, the incoming trigger pulses may be of one or another polarity. Accordingly, it is another object of the present invention to produce a rapid-recovery triggered pulse generator of the type hereinabove described which is responsive to pulses of either polarity.

In many arrangements, it is desirable to obtain simultaneously both positive and negative outputs from the triggered pulse generator. For example, the negative output may be used to block one blanking circuit and the positive output used to unblock another blanking circuit. Therefore, a still further object of the present invention is the provision of a rapid-recovery triggered pulse generator of the type hereinbefore described which provides output pulses of both polarities.

In accordance with a feature of the present invention, the exponential waveform is never applied to the grid of the first or input tube but instead is developed at the grid of a subsequent tube, for example, the second tube.

Further in acordance with the above feature of the present invention, the feedback from the second tube is differentiated to produce sharp pulses corresponding to the leading and trailing edges of the output pulses from the second tube; and only the differentiated pulse corresponding to the leading edge is fed back so that the voltage pulse applied to the input of the first tube, including the feedback voltage, is a sharp spike that will not mask or interfere with the next input trigger pulse and that will allow rapid recovery of the triggered pulse generator.

Other and further objects of the present invention will become apparent and the foregoing will be better understood with reference to the following description of embodiments thereof, reference being had to the drawing, in which the figure is a schematic diagram of a triggered pulse generator in accordance with the present invention.

In the hereindescribed embodiment of the present invention, a two-tube triggered pulse generator is provided in which there is feedback from the output of the second tube to the input of the first tube. In accordance with a feature of the present invention, it is arranged that the input to the first tube as well as the feedback to the first tube is differentiated so as to provide sharp-spiked input pulses, while the exponential waveform is produced at the output of the first tube and used in the second tube to produce the desired relatively wide output pulse of predetermined amplitude.

More specifically and referring now to the drawing, positive going pulses such as indicated by the numerals 1 and 2 are derived from a pulse source 3 and fed through a differentiating network 4, consisting of a series condenser 5 and shunt resistor 6 connected to ground, over line 7 to the grid 8 of a first tube 9 which is shown as a triode but may obviously be a tube including more elements. The tube 9 is biased by potential from a source 10 via a resistor 11 connected to the cathode 12 therof so that the tube is normally cut off in the absence of incoming pulses, and the magnitude of the incoming pulses and the type of tube employed as well as other parameters are arranged so that each input pulse rapidly drives the tube 9 to saturation. The anode 13 is connected via a resistor 14 to the positive side of a source of polarizing potential 15 whose negative side (not shown) is grounded.

Negative input trigger pulses may also be used to trigger the circuit and are applied to the tube 9 from a source 16 via differentiating condenser 17 which together with cathode resistor 18 serves to differentiate the incoming negative pulses before they are applied to the cathode 12.

A condenser 19 is connected to the anode 13 and is charged between successive incoming trigger pulses, condenser 19 being in series with condenser 20 and ground. Condenser 21 has a relatively large capacity and serves as a D.-C. blocking condenser. Condenser 19 discharges when tube 9 conducts, and the resulting exponential charge-discharge waveform developed across said condenser is applied to the grid 22 of the second tube 23. The second tube 23 is normally biased to conduct by a potential derived from source 24 and applied via resistor 25 to the grid 22. The parameters of the tube 23 and its associated circuit are so arranged that tube 23 is rapidly driven to cutoff as condenser 19 discharges. The resulting pulse voltage appearing across the resistor 26 in series with the anode 27 has the form illustrated in the pulse 28 with a steeply leading edge and a somewhat sloping trailing edge. It is of a predetermined duration, greater than the trigger pulse, and is positive in direction. A similarly shaped pulse 29 of reversed polarity with respect to ground is simultaneously produced across the resistor 30 in series with the cathode 31 of tube 23. Output pulses 28 and 29 are fed to output terminals 32 and 33 via output coupling condensers 34 and 35, respectively. The anode-cathode circuit of tube 23 is completed by a source of polarizing potential 36 connected via the anode resistor to anode 27, the negative side of the source being connected (not shown) to ground 39 as is the end of cathode resistor 30.

To increase the sensitivity and the triggering action of the generator, feedback is provided as follows. The anode 27 of tube 2 is connected via a condenser 38 (which forms part of a differentiating network with resistor 6) and via an isolating resistor 39 to grid 8. The differentiated positive pulse 40 corresponding to the leading edge of output pulse 28 and the differentiated negative pulse 41 corresponding to the trailing edge thereof are produced. The negative pulse 41 corresponding to the trailing edge of pulse 28 is cancelled by a properly polarized diode rectifier 42 connected between condenser 38 and ground. To further increase the sensitivity of the generator, the negative output pulse 29 is fed back via a line 43 and a differentiating condenser 44 to the cathode 12 of the first tube. The condenser 44 and the cathode resistor 18 form a differentiating network producing a pair of differentiated pulses 45 and 46, with 45 being negative and corresponding to the leading edge of pulse 29 and 46 being positive and corresponding to the trailing edge thereof. Pulse 46 is eliminated from the feedback by a diode rectifier 47, suitably polarized and connected between condenser 44 and ground. A blocking condenser 53 is provided in series with condenser 44 isolating rectifier 47 from the D.C. current from source 10.

The operation of the foregoing arrangement is as follows. Tube 9 is normally cut off. An incoming trigger pulse from source 3 or 16 is applied via a differentiating network to tube 9 to cause it to conduct. At this point, it may be mentioned that sources 3 and 16 may be a single source arranged to apply trigger pulses of different polarities to the different input lines. Conduction of tube 9 causes condenser 19 to discharge rapidly to produce the steep leading edge of waveform 49 and then more slowly recharge to produce the exponential trailing edge of waveform 49. The leading edge of this waveform immediately blocks tube 23 and maintains it blocked for a predetermined period while condenser 19 is recharging at the end of which, as condenser 19 again approaches its normally full charge, tube 23 again becomes conductive and terminates pulses 28 and 29 in a slightly sloping trailing edge.

As has been pointed out, the feedback is arranged so that only pulses 40 and 45 corresponding to the leading edges of output pulses 28 and 29 are fed back. These pulses coincide with the differentiated input pulses and do not materially broaden them. Thus, at the end of any input trigger pulse, the circuit is ready to react to the next input trigger pulse. Assuming that any two trigger pulses, whether they are both positive or negative or one of each, occur almost immediately following each other with a spacing between the two pulses less than the width of the output pulse 28, it is to be noted that the following action will then occur. Instead of the waveform 49 being produced as condenser 19 is recharging, the second closely following pulse will again cause tube 9 to conduct thereby again discharging condenser 19 and producing the change in waveform 49 indicated by the dotted line 50. This will result in tube 23 being cut off for a longer period of time so that the output pulses 28 and 29 will have the increased duration indicated by the dotted lines 51 and 52. It is to be noted that the second trigger pulse produces a normal-sized output pulse overlapping the output pulse produced by the first trigger pulse.

In the specific embodiment described hereinabove, the triggered pulse generator uses electron discharge tubes. It will be obvious to those versed in the art that other conduction-controlled devices such as transistors might be used in place thereof and utilize the invention described in the annexed claims. It will be seen that the hereinbefore-described arrangement could readily be changed so that conduction of tube 9 will rapidly charge condenser 19 and that the condenser could then be permitted to slowly discharge through a suitable resistance to produce an exponential waveform which would be used to control the second tube. This rearrangement might be of particular applicability where instead of tubes other conduction-controlling devices such as transistors are used. It will further be seen that the system might be arranged to initially produce an exponential leading edge due to the charge or discharge of condenser 19 and an abrupt or sharp trailing edge.

Accordingly, while we have described above the principles of our invention in connection with specific apparatus, it is to be clearly understood that this description is made only by way of example and not as a limitation to the scope of our invention as set forth in the objects thereof and in the accompanying claims.

We claim:

1. A triggered pulse generator comprising a first and second electron discharge tube, biasing means coupled to said first tube for normally blocking said first tube, means for applying input trigger pulses to the input of said first tube to cause conduction thereof, a capacitor, means for charging and discharging said capacitor including said first normally blocked tube which is adapted upon conduction to change the level of the charge on said capacitor, means coupling said capacitor to the input of said second tube for applying the voltage developed thereacross to cut off said second tube while the charge on said capacitor deviates from a predetermined value to thereby produce an output pulse, a feedback path from the output of said second tube to the input of said first tube, means in said feedback path for differentiating the output pulse of said second tube and means in said feedback path for attenuating the differentiated pulse corresponding to the trailing edge of said output pulse.

2. A triggered pulse generator according to claim 1, wherein said means for applying input trigger pulses includes a differentiating network.

3. A triggered pulse generator comprising a first and second electron discharge tube each having a cathode, anode and control element, a source of anode potential, a plurality of circuits each applying said potential between the anode and cathode of a different one of said tubes, biasing means coupled to said first tube for normally blocking said first tube, means including a differentiating network for applying input trigger pulses to the control element of said first tube to cause conduction thereof, a capacitor coupled between the anode and cathode of said first tube and adapted to be discharged on conduction thereof, means for charging said capacitor during the period when said first tube is blocked, means coupling said capacitor to the control element of said second tube for applying the voltage developed thereacross to cut off said second tube when said capacitor is below a predetermined charge condition to thereby produce an output pulse, a feedback path from the output of said second tube to the control element of said first tube, means in said feedback path for differentiating the output pulse of said second tube, and means in said feedback path for attentuating the differentiated pulse corresponding to the trailing edge of said output pulse.

4. A triggered pulse generator according to claim 3, wherein said means for attenuating the differentiated pulse corresponding to the trailing edge of said output pulse comprises a rectifier connected in shunt across said feedback path.

5. A triggered pulse generator comprising a first and second electron discharge tube each having a cathode, anode and control element, a source of anode potential, a plurality of circuits each applying said potential between the anode and cathode of a different one of said tubes, biasing means coupled to said first tube for normally blocking said first tube, means including a differentiating network for applying input trigger pulses to the input of said first tube to cause conduction thereof, a capacitor, means for charging and discharging said capacitor including said first normally blocked tube which is adapted upon conduction to change the level of the charge on said capacitor, means coupling said capacitor to the input of said second tube for applying the voltage developed thereacross to cut off said second tube while the charge on said capacitor deviates from a predetermined value to thereby produce an output pulse on the anode of said second tube, a cathode resistor coupled in series with the cathode of said second tube across which a second output pulse is produced simultaneously with the anode outpult pulse, a first feedback path from the anode of said second tube to the input of said first tube, a second feedback path from the cathode of said second tube to the input of said first tube and means in each of said feedback paths for differentiating the output pulse in said feedback path.

6. A triggered pulse generator according to claim 5, further including means in each of said feedback paths for attenuating the differentiated pulse corresponding to the trailing edge of its corresponding output pulse.

7. A triggered pulse generator according to claim 5, wherein said first feedback path includes means for applying the fed-back energy to the control element at the input of said first tube and said second feedback path includes means for applying the fed-back energy to the cathode at the input of said first tube.

8. A triggered pulse generator comprising a first and second conduction-controlling device each having a control element, biasing means coupled to said first device for normally blocking conduction therein, means including a differentiating network for applying input trigger pulses to the control element of said first device to cause conduction thereof, a capacitor, means for charging and discharging said capacitor including said first normally blocked conduction device which is adapted upon conduction to change the level of the charge on said capacitor, means coupling said capacitor to the control element of said second device for applying the voltage developed thereacross to cut off said second device while the charge on said capacitor deviates from a predetermined value to thereby produce an output pulse, a feedback path from the output of said second device to the control element of said first device, means in said feedback path for differentiating the output pulse of said second device and means in said feedback path for attenuating the differentiated pulse corresponding to the trailing edge of said output pulse.

References Cited in the file of this patent

UNITED STATES PATENTS

| | | |
|---|---|---|
| 2,470,028 | Gordon | May 10, 1949 |
| 2,554,308 | Miller | May 22, 1951 |
| 2,605,406 | Bartelink et al. | July 29, 1952 |
| 2,636,985 | Weissman | Apr. 28, 1953 |
| 2,644,887 | Wolfe | July 7, 1953 |
| 2,683,806 | Moody | July 13, 1954 |